(12) United States Patent
Fullerton et al.

(10) Patent No.: US 7,958,575 B2
(45) Date of Patent: Jun. 14, 2011

(54) TOILET SAFETY APPARATUS, SYSTEMS, AND METHODS

(75) Inventors: Larry W. Fullerton, New Hope, AL (US); Mark D. Roberts, Huntsville, AL (US); James L. Richards, Fayetteville, TN (US)

(73) Assignee: Cedar Ridge Research, LLC, New Hope, AL (US)

( * ) Notice: Subject to any disclaimer, the term of this patent is extended or adjusted under 35 U.S.C. 154(b) by 0 days.

(21) Appl. No.: 12/896,424

(22) Filed: Oct. 1, 2010

(65) Prior Publication Data
US 2011/0018660 A1 Jan. 27, 2011

Related U.S. Application Data (63) Continuation-in-part of application No. 12/476,952, filed on Jun. 2, 2009, and a continuation-in-part of application No. 12/322,561, filed on Feb. 4, 2009, and a continuation-in-part of application No. 12/358,423, filed on Jan. 23, 2009, now Pat. No. 7,868,721, and a continuation-in-part of application No. 12/123,718, filed on May 20, 2008, now Pat. No. 7,800,471.

(60) Provisional application No. 61/278,229, filed on Oct. 2, 2009.

(51) Int. Cl.
*H01F 7/20* (2006.01)
*H01F 7/02* (2006.01)
*A47K 13/00* (2006.01)

(52) U.S. Cl. .............. 4/242.1; 4/234; 335/285; 335/306

(58) Field of Classification Search .................. 335/285, 335/302–306; 24/303; 4/234, 242.1
See application file for complete search history.

(56) References Cited

U.S. PATENT DOCUMENTS

| 381,968 A | 5/1888 | Tesla |
| 493,858 A | 3/1893 | Edison |
| 996,933 A | 7/1911 | Lindquist |
| 1,236,234 A | 8/1917 | Troje |
| 2,389,298 A | 11/1945 | Ellis |
| 2,570,625 A | 10/1951 | Zimmerman et al. |
| 2,722,617 A | 11/1955 | Kluwen et al. |
| 2,932,545 A | 4/1960 | Foley |
| 3,102,314 A | 9/1963 | Alderfer |
| 3,208,296 A | 9/1965 | Baermann |
| 3,288,511 A | 11/1966 | Tavano |
| 3,468,576 A | 9/1969 | Beyer et al. |
| 3,474,366 A | 10/1969 | Barney |
| 3,802,034 A | 4/1974 | Bookless |
| 4,079,558 A | 3/1978 | Gorham |

(Continued)

FOREIGN PATENT DOCUMENTS
FR 823395 1/1938

(Continued)

*Primary Examiner* — Ramon M Barrera
(74) *Attorney, Agent, or Firm* — Tomas Friend (57) ABSTRACT

An embodiment of the present invention provides a correlated magnet toilet seat cover lock which may include a first correlated magnetic field structure securely attachable to a toilet bowl, a second correlated magnetic field structure that is complementary to the first correlated magnetic field structure and securely attachable to a toilet seat cover, and wherein the first correlated magnetic field structure associated with the toilet bowl is capable of being aligned with the second correlated magnetic field structure attachable to the toilet seat cover such that the toilet bowl and the toilet seat cover produce an attractive force that secures the toilet seat cover to the toilet seat bowl.

21 Claims, 10 Drawing Sheets

U.S. PATENT DOCUMENTS

| | | | |
|---|---|---|---|
| 4,222,489 A | 9/1980 | Hutter | |
| 4,453,294 A | 6/1984 | Morita | |
| 4,547,756 A | 10/1985 | Miler et al. | |
| 4,629,131 A | 12/1986 | Podell | |
| 4,941,236 A | 7/1990 | Sherman et al. | |
| 5,050,276 A | 9/1991 | Pemberton | |
| 5,367,891 A | 11/1994 | Furuyama | |
| 5,383,049 A | 1/1995 | Carr | |
| 5,495,221 A | 2/1996 | Post | |
| 5,512,732 A | 4/1996 | Yagnik et al. | |
| 5,631,093 A | 5/1997 | Perry et al. | |
| 5,631,618 A | 5/1997 | Trumper et al. | |
| 6,072,251 A | 6/2000 | Markle | |
| 6,170,131 B1 | 1/2001 | Shin | |
| 6,189,159 B1 * | 2/2001 | Bailey et al. | 4/235 |
| 6,275,778 B1 | 8/2001 | Shimada et al. | |
| 6,457,179 B1 | 10/2002 | Prendergast | |
| 6,467,326 B1 | 10/2002 | Garrigus | |
| 6,607,304 B1 | 8/2003 | Lake et al. | |
| 6,720,698 B2 | 4/2004 | Galbraith | |
| 6,847,134 B2 | 1/2005 | Frissen et al. | |
| 6,862,748 B2 | 3/2005 | Prendergast | |
| 6,927,657 B1 | 8/2005 | Wu | |
| 6,971,147 B2 | 12/2005 | Halstead | |
| 7,031,160 B2 | 4/2006 | Tillotson | |
| 7,066,778 B2 | 6/2006 | Kretzschmar | |
| 7,207,102 B1 | 4/2007 | Roesler | |
| 7,362,018 B1 | 4/2008 | Kulogo et al. | |
| 7,444,683 B2 | 11/2008 | Prendergast et al. | |
| 2004/0003487 A1 | 1/2004 | Reiter | |
| 2005/0102802 A1 | 5/2005 | Sitbon et al. | |
| 2006/0066428 A1 | 3/2006 | McCarthy et al. | |
| 2006/0189259 A1 | 8/2006 | Park et al. | |
| 2006/0290451 A1 | 12/2006 | Prendergast et al. | |
| 2008/0186683 A1 | 8/2008 | Ligtenberg et al. | |
| 2008/0272868 A1 | 11/2008 | Prendergast et al. | |
| 2008/0282517 A1 | 11/2008 | Claro | |

FOREIGN PATENT DOCUMENTS

WO    WO 2007081830 A2 *    7/2007

* cited by examiner

TOILET SAFETY APPARATUS, SYSTEMS, AND METHODS

CROSS REFERENCE TO RELATED APPLICATIONS

This patent application is a continuation-in-part of and claims priority under 35 U.S.C. 119 and 120 to U.S. Provisional Application Ser. No. 61/278,229, filed Oct. 2, 2010, and entitled "Apparatus, Systems, and Methods Using Correlated Magnets," which is incorporated herein by reference in its entirety.

This application is a continuation-in-part of and claims priority under 35 U.S.C. 120 to U.S. patent application Ser. No. 12/476,952 filed on Jun. 2, 2009 and entitled "A Field Emission System and Method", which is a continuation-in-part application of U.S. patent application Ser. No. 12/322,561 filed on Feb. 4, 2009 and entitled "A System and Method for Producing an Electric Pulse", which is a continuation-in-part application of U.S. patent application Ser. No. 12/358,423 filed on Jan. 23, 2009 and entitled "A Field Emission System and Method", which is a continuation-in-part application of U.S. patent application Ser. No. 12/123,718 filed on May 20, 2008 and entitled "A Field Emission System and Method". The contents of these four documents are hereby incorporated herein by reference.

FIELD OF THE INVENTION

The present invention relates generally to a toilet safety apparatus, systems, and methods. More particularly, the present invention relates to a toilet safety apparatus, systems and methods where correlated magnetic and/or electric field structures create spatial forces in accordance with the relative alignment of the field emission structures and a spatial force function.

BACKGROUND OF THE INVENTION

Common household appliances and furnishings can be hazardous to infants, mentally impaired adults, and household pets. Toilets commonly contain enough water for an infant or toddler to drown should they fall into an open toilet. Toilets often contain chemical cleaners and disinfectants that cause injury or death when ingested by children or pets. Additionally, falling toilet seats or toilet lids can cause injury in some circumstances. Mechanical locks or latches for controlling the open or closed positions of a toilet lid, for example, can be difficult to latch and unlatch, cause premature wear on toilet surfaces and, depending on their shape or design, may even be hazardous in and of themselves. There is a need, therefore, for systems that allow for control of the open and closed positions of toilet lids and the raised and lowered positions of toilet seats that are easy to use, childproof, safe, and resistant to wear. The present invention fills this need in the art by providing toilet safety apparatus, systems, and methods based upon correlated magnet technology.

SUMMARY OF THE INVENTION

The present invention pertains to an apparatus, systems, and methods related to toilet safety. The invention comprises at least one pair of magnetic field emission structures, each comprising an array of magnetic field emission sources. The field emission structures are also referred to as correlated magnets. A first magnetic field emission structure is attached to a first component of a toilet and a second magnetic field emission structure is attached to a second component of the toilet that is moveable with respect to the first component of the toilet. The field emission sources in the first and second magnetic field emission structures, respectively, have positions and polarities relating to a desired spatial force function that corresponds to a relative alignment of the first and second magnetic field emission structures within a field domain. The first and second magnetic field emission structures are configured to produce a maximum attractive spatial force between the first and second magnetic field emission structures when they are aligned in such a way as to correlate the two magnetic field emission structures. The attractive force between the two magnetic field emission structures produces a minimal, or at least a reduced attractive spatial force between the two magnetic field emission structures when they are aligned in such a way as to decorrelate the two magnetic field emission structures.

The spatial force is typically about an order of magnitude less than the peak spatial force when the first and second field emission structures are not substantially aligned such that field emission source of the first field emission structure substantially aligns with a corresponding field emission source of said second field emission structure. The relative alignment of the first and second field emission structures can result from the relative movement between the first and second field emission structures in one, two, or three dimensions along linear, non-linear, rotational, cylindrical, or spherical paths.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

The present invention comprises two field emission structures that incorporate correlated magnets that enable two components of a toilet that are otherwise moveable with respect to one another to be securely fastened to one another. The field emission structures may also be used to secure a moveable component of a toilet to a nearby immovable structure.

The present invention is made possible, in part, by the use of correlated magnetic technology, three generations of which is fully described and enabled in the co-assigned U.S. patent application Ser. No. 12/123,718 filed 20 May 2008 now U.S. Pat. No. 7,800,471, issued Sep. 21, 2010; U.S. patent application Ser. No. 12/358,423 filed 23 Jan. 2009; and U.S. patent application Ser. No. 12/476,952 filed 2 Jun. 2009, which are incorporated herein by reference in their entirety. Correlated inductance, which is related to correlated magnetism, is described and enabled in U.S. patent application Ser. No. 12/322,561 filed 4 Feb. 2009 and is also incorporated by reference herein.

Correlated Magnetics Technology

Correlated magnets are made from a combination of magnetic field emission sources configured in accordance with a preselected code having desired correlation properties. Alignment of a magnetic field emission structure with a complementary, or mirror image, magnetic field emission structure brings the various magnetic emission sources in the correlated magnets into alignment and results in a peak spatial attraction between the correlated magnetic field emission structures, or correlated magnets. Misalignment of the magnetic field emission structures causes the various magnetic emission sources in the correlated magnets to substantially cancel each other out in a manner that is a function of the particular code used to design the two magnetic field emission structures. In contrast to mirror image, or complementary, magnetic field emission structures, alignment of identical magnetic field emission structures results in a peak spatial repelling force between the identical magnetic field emission structures. Misalignment of the magnetic field emission structures, in such a case, also causes the various magnetic emission sources in the correlated magnets to substantially cancel each other out in a manner that is a function of the particular code used to design the two magnetic field emission structures.

The magnitude of spatial attracting or repelling forces between correlated magnets is a function of the relative alignment of the two magnetic field emission structures and their corresponding spatial force (or correlation) function, the distance between the two magnetic field emission structures, and the magnetic field strengths and polarities of the various magnetic field emission sources making up the two magnetic field emission structures. The spatial force functions can be used to achieve precision alignment and precision positioning not possible with conventional, basic magnets. The spatial force functions of correlated magnets also enables the precise control of magnetic fields and associated spatial forces, making new forms of attachment devices with precise alignment and systems for precisely controlling the position and movement of objects possible.

One of the unique characteristics associated with correlated magnets that is applied in the present invention relates to the situation in which the various magnetic field sources making up two magnetic field emission structures can effectively cancel out each other when they are brought out of alignment, which is described herein as a releasing force. The process of bringing two magnetic field emission structures out of alignment moves them into an orientation with respect to one another that is sometimes called "decorrelated."

One skilled in the art of coding theory will recognize that there are many different types of codes having different correlation properties that have been used in communications for channelization purposes, energy spreading, modulation, and other purposes. Many of the basic characteristics of such codes make them applicable for use in producing the magnetic field emission structures described herein. Although a Barker code is used as an example herein, other forms of codes which may or may not be well known in the art are also applicable to correlated magnets because of their autocorrelation, cross-correlation, or other properties are also applicable to the present invention including, for example, Gold codes, Kasami sequences, hyperbolic congruential codes, quadratic congruential codes, linear congruential codes, Welch-Costas array codes, Golomb-Costas array codes, pseudorandom codes, chaotic codes, Optimal Golomb Ruler codes, one-dimensional codes, two-dimensional codes, three-dimensional codes, four-dimensional codes, and combinations thereof.

Generally, the spatial force functions of the present invention are in accordance with a code, where the code corresponding to a code modulo of first field emission sources and a complementary code modulo of second field emission sources. The code defines a peak spatial force corresponding to substantial alignment of the code modulo of the first field emission sources with the complementary code modulo of the second field emission sources. The code also defines a plurality of off peak spatial forces corresponding to a plurality of different misalignments of the code modulo of the first field emission sources and the complementary code modulo of the second field emission sources. The plurality of off peak spatial forces have a largest off peak spatial force, where the largest off peak spatial force is less than half of the peak spatial force.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

A correlated magnet toilet seat cover lock comprises at least one pair of complementary correlated magnetic field structures, or correlated magnets, with the first correlated magnetic field structure secured to a moveable component of a toilet which is to be locked. The second correlated magnetic field structure of the pair is secured to another, preferably immovable component of the toilet such as the bowl or the base. The second correlated magnetic field structure, or correlated magnet, may alternatively be attached to a wall or floor or other immovable object. The first and second correlated magnets of the correlated magnet pair are configured to be alignable to produce an attractive force that is much stronger than the attractive force between the two correlated magnets when they are not aligned. This allows one to manipulate one or both of the correlated magnets to place them in a relative orientation to produce either a strong, locking attraction between them, or a much weaker, non-locking attraction between them. When the pair of correlated magnets is in the locked position, the attractive force between the first and second correlated magnets of the pair prevents the movement of one component of the toilet relative to another component, for example the lid relative to the bowl. The first and second correlated magnets may be secured to components of the toilet by virtually any securing means including adhesives and fasteners such as screws and bolts. The correlated magnets may also be incorporated into a component of the toilet as an integral part of the toilet component. The correlated magnets may be secured directly to the components or indirectly through more than one securing means. The operating principle of the invention is illustrated by way of the following examples.

FIGS. 1-4 illustrate an example of a correlated magnetic toilet seat cover lock 10 in which the lock 10 holds the toilet seat cover 11 at a relative fixed position with respect to the toilet bowl 12. In this example, the lock 10 comprises three pairs 13 of first 13a and second 13b complementary correlated magnets used to secure the toilet seat cover 11 and the toilet bowl 12. For each pair 13, the first correlated magnet 13a is capable of being aligned with the second correlated magnet 13b such that the toilet bowl 12 and said toilet seat cover 11 are secured to one another by an attractive force, and at least one of the first correlated magnet 13a or the second correlated magnet 13b of each pair 13 is rotatable to enable a person to decorrelate the pair to release the toilet seat cover 11 from the toilet bowl 12.

Figure 1:
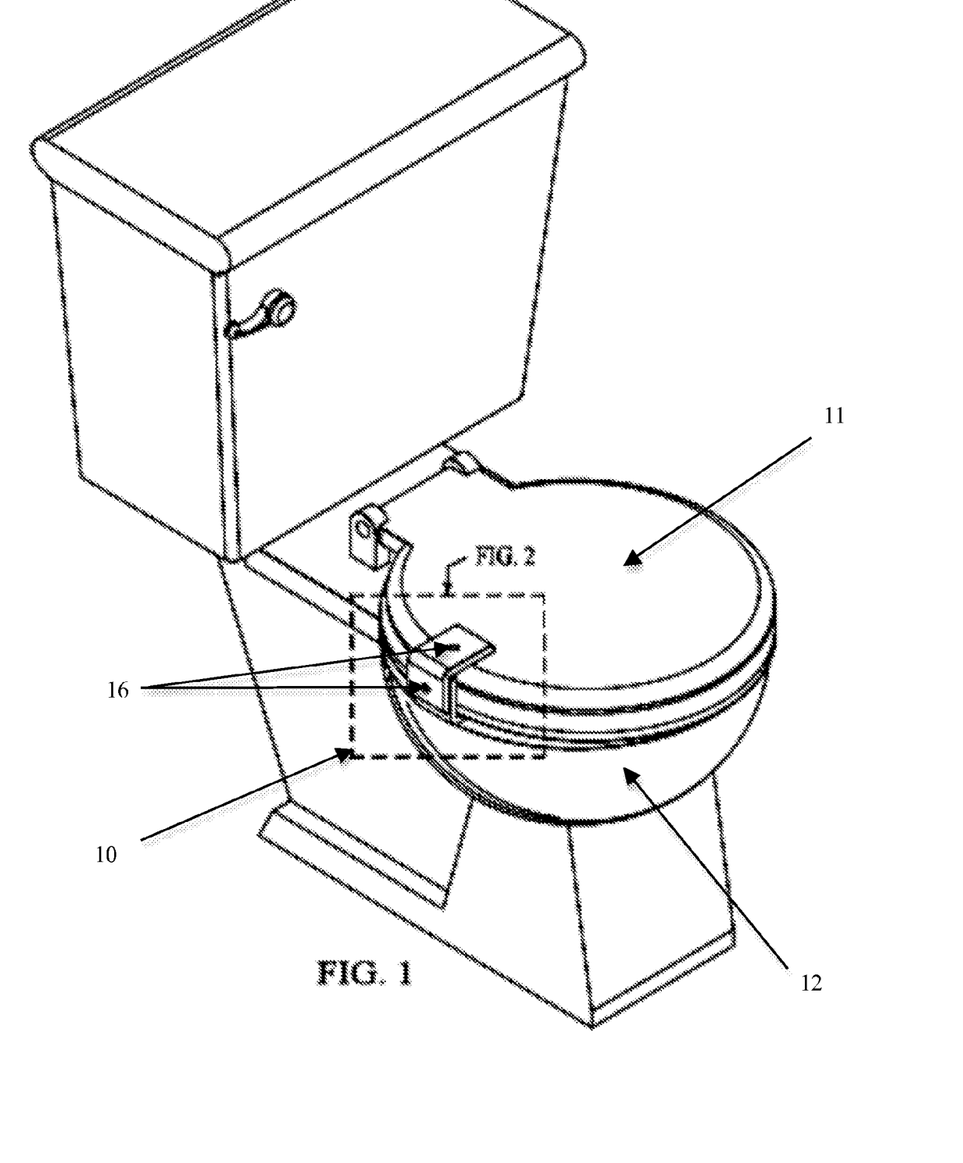
FIGS. 1-4 illustrate an example of a correlated magnetic toilet seat cover lock that holds a toilet seat cover at a relative fixed position with respect to the toilet bowl.
Figure 2:
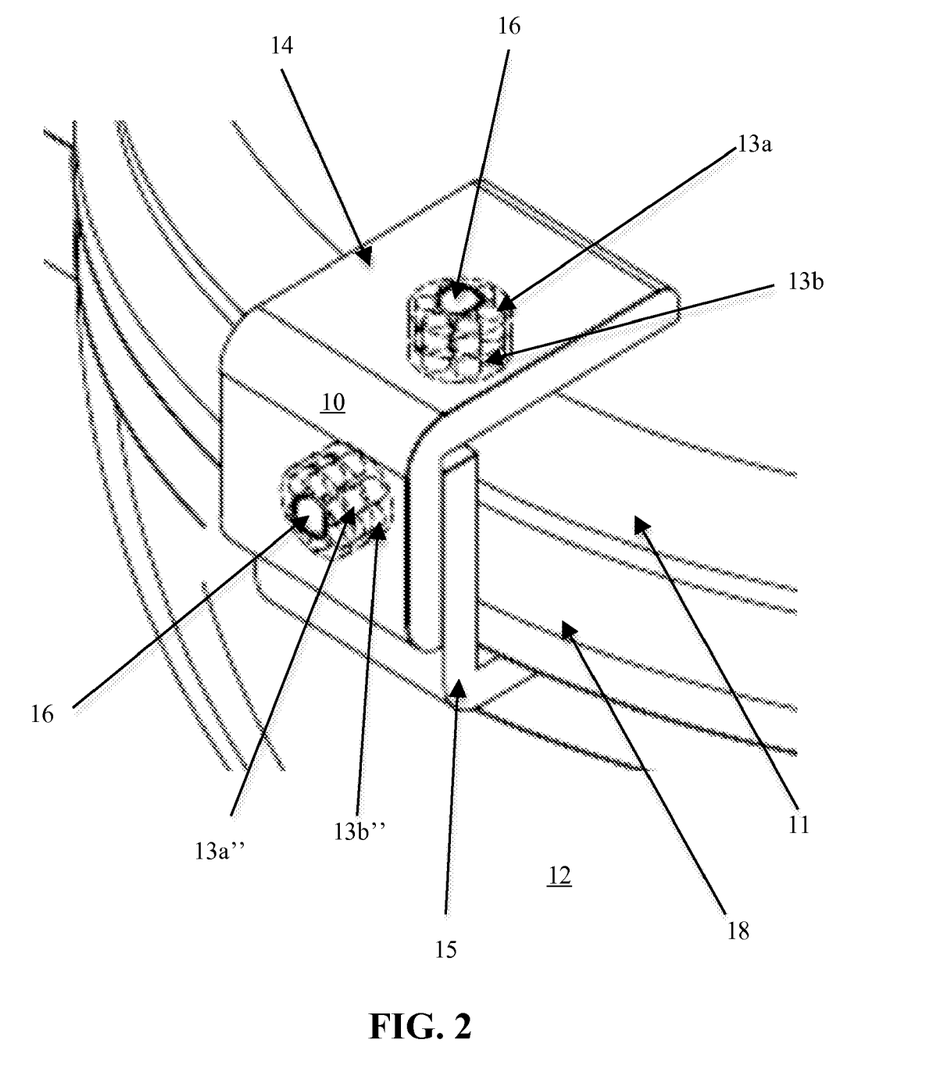
Figure 3:
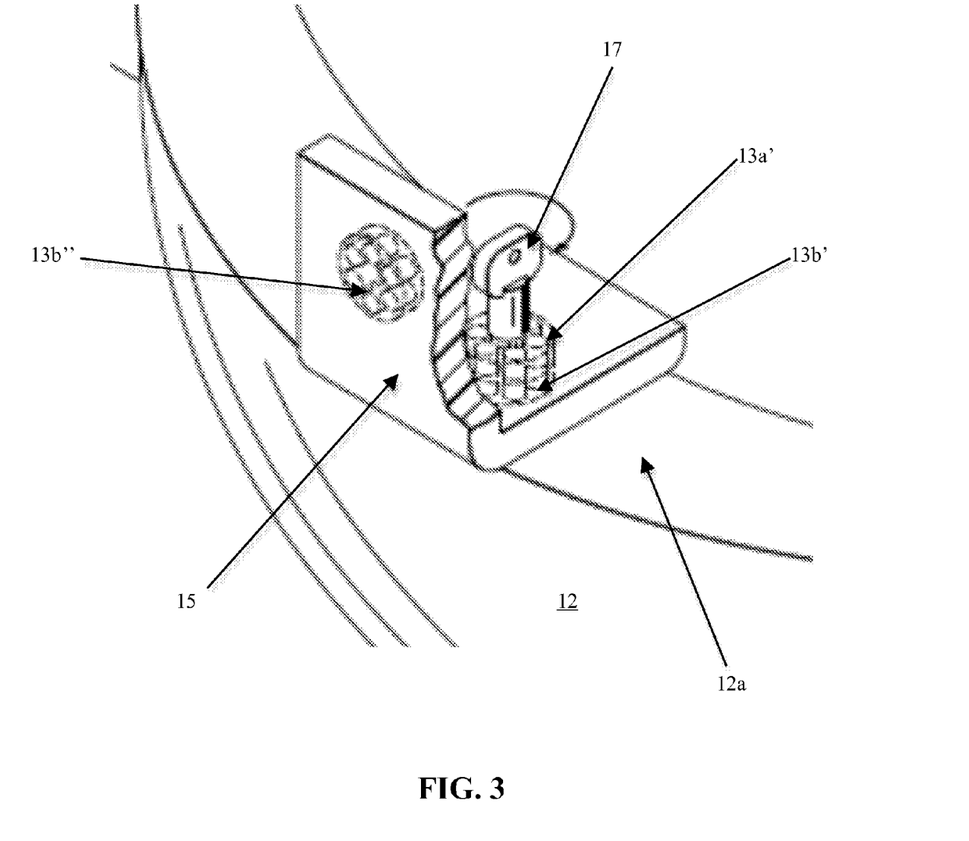
Figure 4:
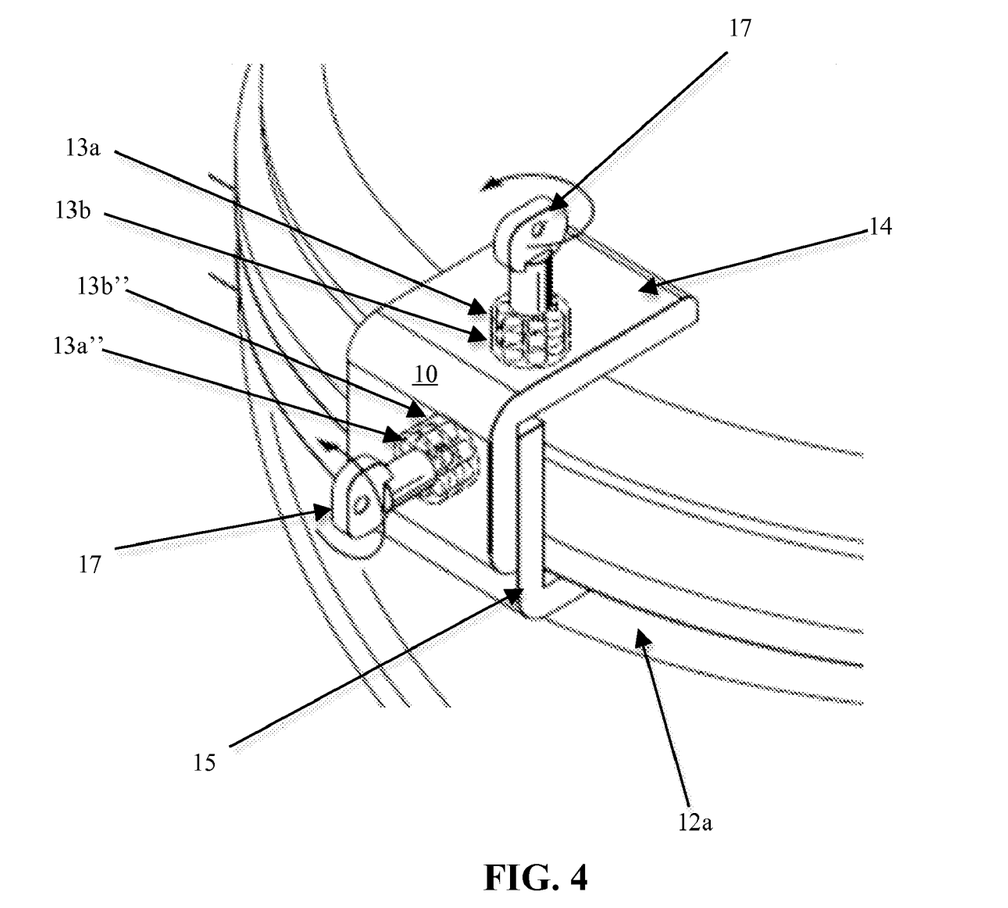
Figure 5:
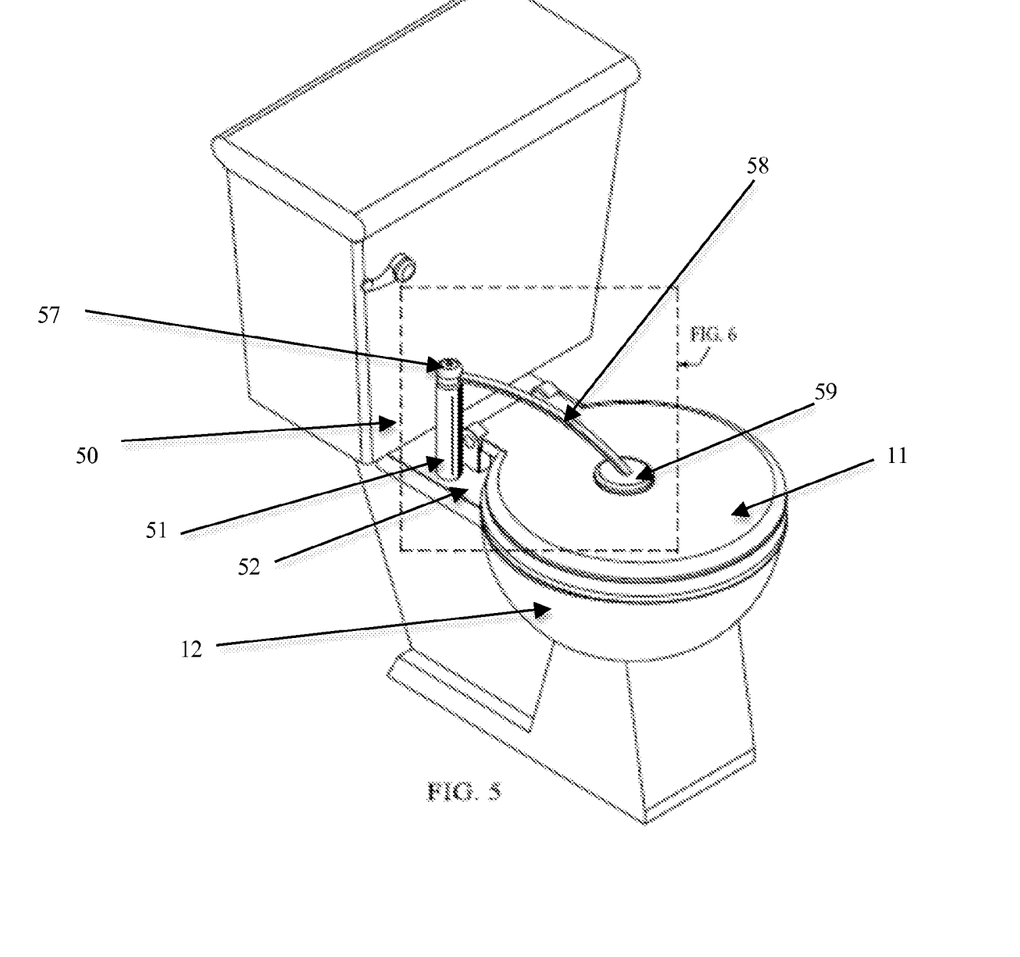
FIGS. 5-9 illustrate an example of a correlated magnetic toilet seat cover lock secured on a toilet base.
Figure 6:
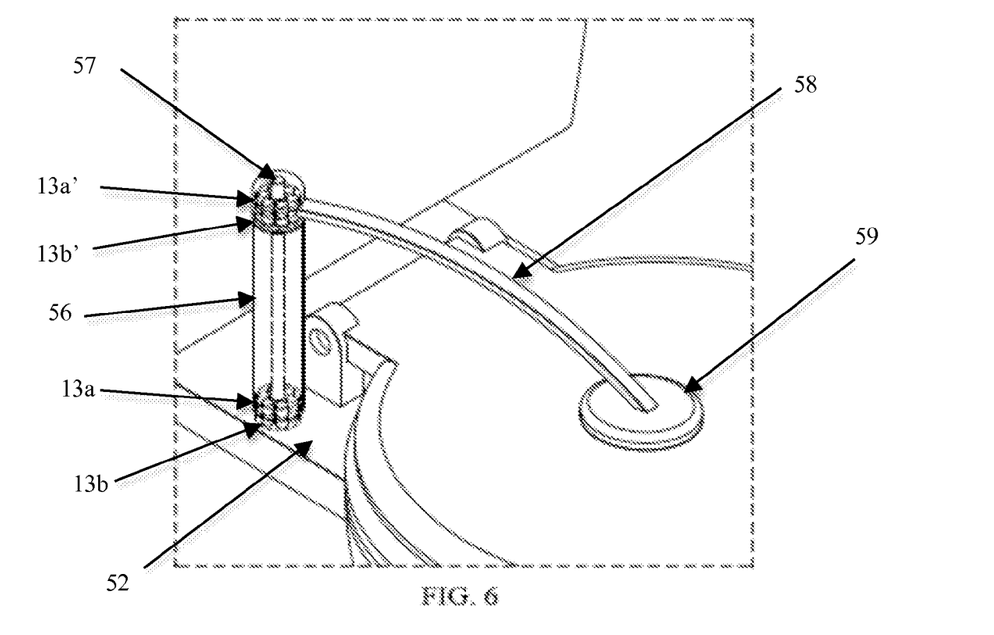

In accordance with the invention, one or more pairs 13 of first and second complementary correlated magnets 13a and 13b may be used to secure the seat cover 11 and toilet bowl 12. FIGS. 2-4 illustrate an example in which a first complementary correlated magnet pair 13 is used to secure the toilet seat cover 11 to a first bracket 14, where the first complementary correlated magnet 13a is integrated into (or otherwise associated with) the first bracket 14 and the second correlated magnet 13b is integrated into (or otherwise associated with) the toilet seat cover 11. A second complementary correlated magnet pair 13' is used to secure the toilet bowl 12 to a second bracket 15 (see FIG. 3), where the first complementary correlated magnet 13a is integrated with (or otherwise associated with) the second bracket 15 and the second complementary correlated magnet 13b is integrated with (or otherwise associated with) the toilet bowl 12. A third complementary correlated magnet pair 13 is used to secure the first bracket 14 to the second bracket 15, where the first complementary correlated magnet 13a is integrated with (or otherwise associated with) the first bracket 14 and the second complementary correlated magnet 13b is integrated with (or otherwise associated with) the second bracket 15. In this example, first and second brackets 14 and 15 are fastened to the toilet seat cover 11 and bowl toilet 12 by two correlated magnet pairs 13 and 13'. However, one skilled in the art will recognize that the first and second brackets 14 and 15 may be secured to the toilet seat cover 11 and bowl 12 by any fastening or securing means and the invention can instead be practiced by using just one correlated magnet pair 13 to attach and detach the first and second brackets 14 and 15.

Correlated magnets 13a, 13a', 13a" may be moved or rotated relative to each of their corresponding complementary correlated magnets 13b, 13b', 13b" to align (correlate) the complementary correlated magnet pairs or misalign (decorrelate) the complementary correlated magnet pairs. Aligning, the correlated magnet pairs results in a strong attractive force between them and locks them together. Decorrelating complementary magnet pairs results in a very weak attractive force between them and allows them to be easily separated from one another. In this example, each of the complementary correlated magnet pairs 13, 13', and 13" are configured to be rotated with respect to one another to align or decorrelate the magnet pairs. This may be achieved, for example, by configuring one or both of the correlated magnets in each pair to be grasped and rotated directly, or indirectly using a turning mechanism. FIG. 3 and FIG. 4 illustrate an example in which correlated magnets 13a, 13a', 13a" are provided with openings 16 configured for accepting keys 17 configured to facilitate easy rotation of correlated magnet 13a', 13a', 13a" to align and decorrelate the three correlated magnet pairs 13, 13', and 13'". Keys 17 may be different but are preferably the same key, which fits into openings 16. All three pairs of complementary correlated magnets need not be configured to accept a key and instead could have a knob or other means for a person to rotate the correlated magnets 13a, 13a', and 13a".

Figure 10:
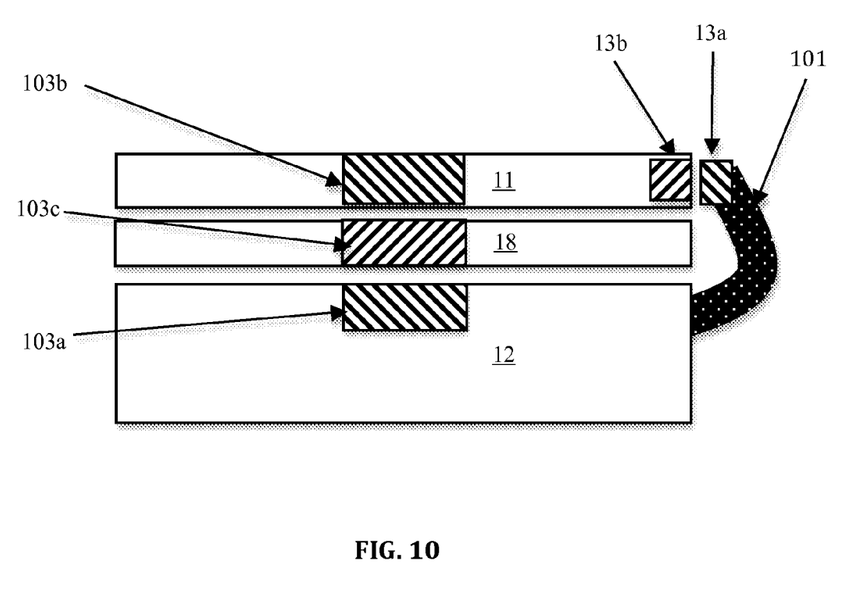
FIG. 10 illustrates two alternative examples of a correlated magnetic toilet seat cover lock secured on a toilet bowl.

A toilet safety lock according to the invention need not be limited to reversibly locking the toilet seat cover to the toilet bowl. For example, additional correlated magnets can be used to reversibly lock a toilet seat in a raised or lowered position, a toilet seat cover in a raised or lowered position, a seat relative to a seat cover, a seat to a bowl, or seat cover to a seat, which in turn is locked to a bowl. FIG. 10 shows an embodiment comprising a first correlated magnetic field structure securely attachable to a toilet bowl 103a; a second correlated magnetic field structure 103b that is complementary to the first correlated magnetic field structure and securely attachable to a toilet seat cover 11; and a third correlated magnetic field structure 103c complementary to the first correlated magnetic field structure and securely attachable to a toilet seat 18, wherein the first correlated magnetic field structure associated with the toilet bowl is alignable with the second correlated magnetic field structure attached to the toilet seat cover and the third correlated magnetic field structure is alignable with the correlated magnetic structure attachable to toilet bowl to produce an attractive force that secures the toilet seat cover to the toilet seat and further to the toilet seat bowl.

FIGS. 5-9 illustrate an example of a correlated magnetic toilet seat cover lock 50 in which the lock 50 is secured on the toilet base 52 and comprises a spacer 56, a pivoting means 57, an extension arm 58, and a toilet lid contacting means 59. Pivoting means 57, extension arm 58, and toilet seat cover contacting means 59 may be made of a single, continuous component, such as a piece of molded plastic, or it may comprise separate components reversible or permanently attached to one another. Spacer 56 is shown as a cylinder that spans a vertical distance sufficient to locate the pivoting means in a plane above the surface of the toilet seat cover 11. The spacer 56 need not be cylindrical and may have a cross-section that is square, rectangular, oval, or irregular as long as the shape does not interfere with the raising and lowering of the toilet seat cover 11 or seat (not shown). The spacer means 56 is shown as placing the pivoting means 57 in a plane above the toilet seat cover 11. This need not be the case if the shape of extension arm 58 is curved in a manner so as to clear the seat cover 11 such that the seat cover contacting means is properly located on the top surface of the seat cover. The spacer need not be oriented vertically and may be attached to locations other than the location shown in FIGS. 5-9. For example, the spacer may be longer and secured to the toilet base near the bottom of the toilet; the spacer may be curved and attached to a vertical surface on the toilet base. It is also possible to mount the space to other fixed surfaces near the toilet seat cover such as a wall or floor. The extension arm 58 is shown in the figures as being curved and having a rectangular cross-section but it may have any suitable shape as long as it spans a distance between the pivoting means 57 and seat cover contacting means 59 in a manner that places the seat cover contacting means 59 on the seat cover when lock 50 is in the locked position and in a position allowing the placement of the seat cover 11 in the upright position when lock 50 is in the unlocked position. Seat cover contacting means 59 is shown in the figures as having circular shape but may have any suitable shape for contacting the seat cover.

Spacer 56 may be secured to the toilet base 52 by any fastening means including adhesives, screws, bolts, correlated magnets, and the like. The example in FIGS. 5-9 shows an embodiment in which the spacer 56 is reversibly attached to the toilet base 52 by a first pair of complementary correlated magnets 13 comprising a first correlated magnet 13a secured to the spacer 56 and a second correlated magnet 13b that is complementary to the first magnet 13a and is secured to the toilet base 52. Pivoting means 57 is attached to the spacer by a second pair of complementary correlated magnets 13', comprising first correlated magnet 13a' and second correlated magnet 13b', which is complementary to the first correlated magnet 13a'. Any suitable means may be used to secure complementary magnets 13a and 13b' to the spacer or complementary magnets 13a and 13b' may each be an integral part of the spacer 56. Similarly, correlated magnets 13b and 13a' may be secured to the toilet base 52 or pivoting means 57, respectively, by any suitable means including adhesives, bolts, screws, and the like or correlated magnets 33b and 33a' may be integrated into the toilet base 52 and pivoting means 57, respectively.

Correlated magnets 13a and 13a' may be moved or rotated relative to each of their corresponding complementary correlated magnets 13b and 13b' to align (correlate) the complementary correlated magnet pairs or misalign (decorrelate) the complementary correlated magnet pairs. Aligning, the correlated magnet pairs results in a strong attractive force between them and locks them together. Decorrelating complementary magnet pairs results in a very weak attractive force between them and allows them to be easily separated from one another. In this example, one correlated magnet of each of the complementary correlated magnet pairs 13 and 13' is configured to be rotated with respect to the other correlated magnet to align or decorrelate the correlated magnet pairs 13 and 13'. This may be achieved, for example, by configuring one or both of the correlated magnets in each pair to be grasped and rotated directly, or indirectly using a turning mechanism.

Figure 7:
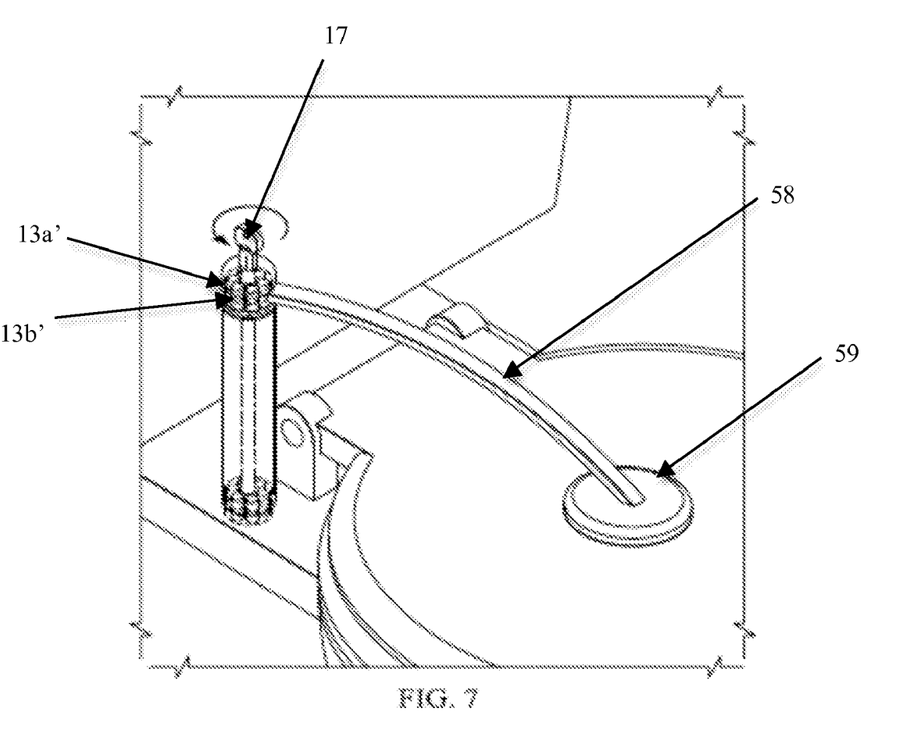
Figure 8:
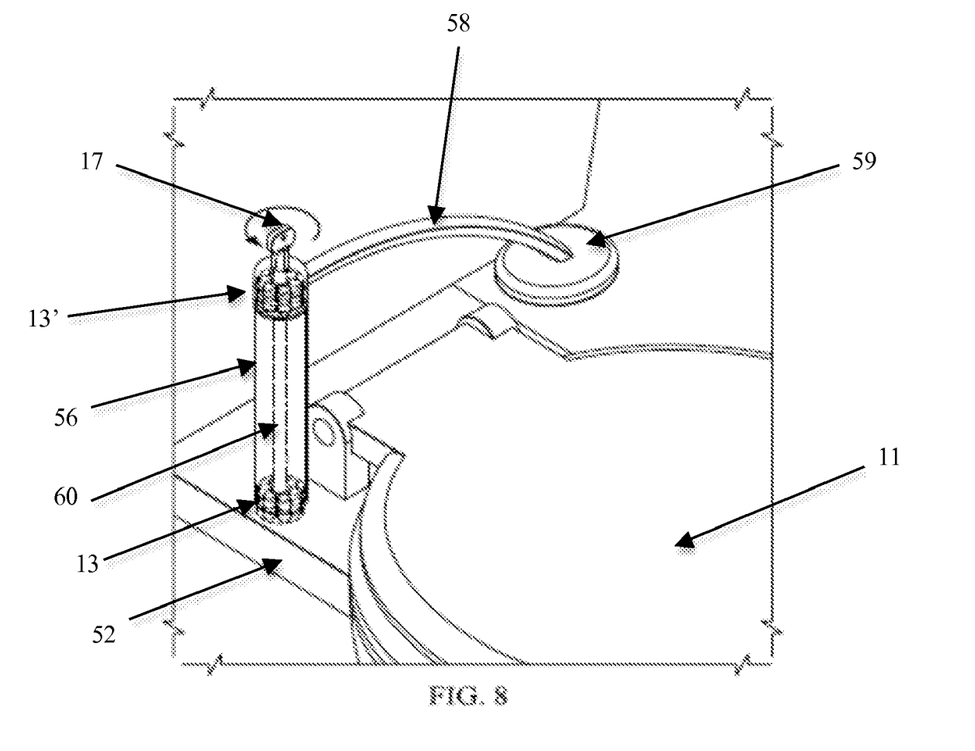
Figure 9:
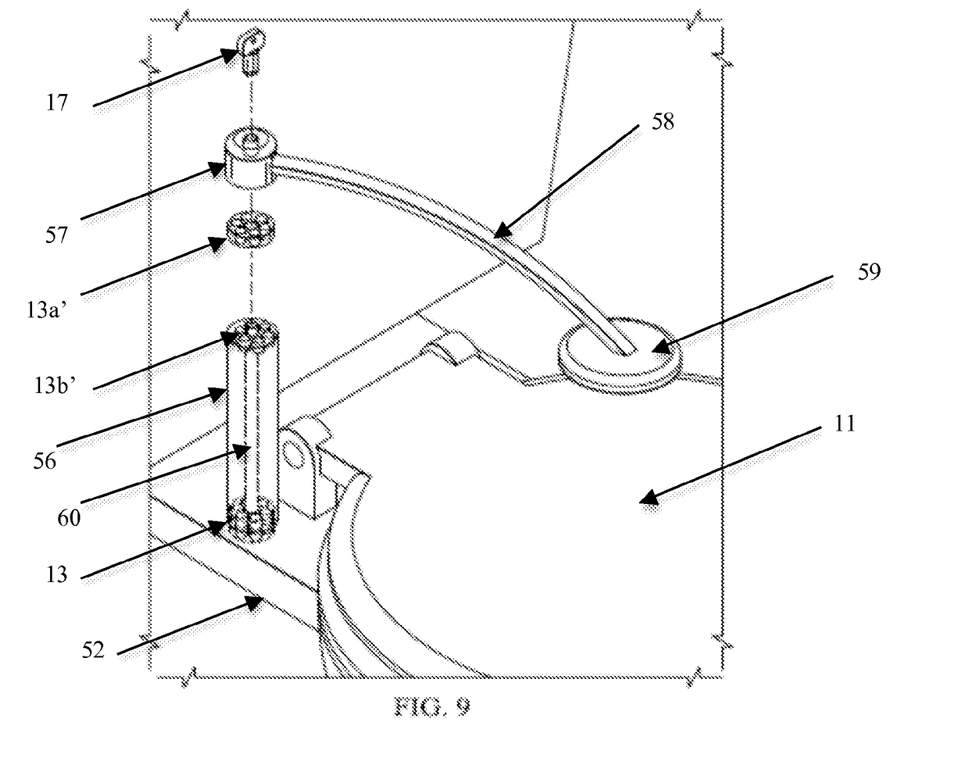

FIG. 7 through FIG. 9 illustrate an example in which correlated magnet 13a is provided with an opening 16 configured for accepting a key 17 to facilitate easy rotation of correlated magnet 13a to align and decorrelate the first correlated magnet pair 13. Opening 17 may be mechanically coupled to correlated magnet 13a, for example by a shaft 60 that is configured to decorrelate complementary correlated magnets 13a and 13b by rotating correlated magnet 13a relative to correlated magnet 13b. The shaft may be configured, for example, to decorrelate correlated magnet pairs 13 and 13' simultaneously or one after the other.

Pivoting means 57 may be a cap-like structure that is seated over the top end of spacer 56 as shown in FIGS. 6-9. Pivoting means 57 may also be, for example, a disk that contains correlated magnet 55a. Pivoting means 57 may comprise locking means (not shown) that prevent pivoting means 57 from rotating with respect to the spacer 56 when pivoting means 57 is secured to spacer 56 by correlated magnet pair 13'. Locking means for preventing the rotation of pivoting means 57 may comprise, for example, complementary slots and tabs on spacer 56 and pivoting means 57 that interlock when pivoting means 57 is lowered onto the end of spacer 56. Complementary slots and tabs may be replaced, for example by complementary indentations and grooves or ridges and trenches. When the correlated magnet pair 13' is decorrelated, the attractive force between the magnets, and therefore the pivoting means 57 and spacer 56, is greatly reduced, allowing the pivoting means to be rotated to swing the extension arm 58 into a position in which the seat cover contacting means 59 does not block the repositioning of the seat cover 11 into the upright position.

The invention may also be embodied as a flexible strap 101 that is attached at one end to a toilet bowl 12 and to a first correlated magnet 13a at the other end that is complementary to a second correlated magnet 13b secured to a toilet seat cover 11 (FIG. 10). The two complementary correlated magnets are configured to lock the seat cover to the bowl when the correlated magnets are aligned and unlock the seat cover from the bowl when the two complementary correlated magnets are decorrelated. As with the previously described embodiments, the correlated magnets can be attached to toilet or lock components or may be integral parts of the components. Additional correlated magnet may be incorporated to fix additional toilet components to the flexible strap or to one or more correlated magnets located on the flexible strap.

While particular embodiments of the invention have been described, it will be understood, however, that the invention is not limited thereto, since modifications may be made by those skilled in the art, particularly in light of the foregoing teachings.

The invention claimed is:
1. A correlated magnet toilet seat cover lock, comprising:
   a first correlated magnetic field structure securely attachable to a toilet bowl;
   a second correlated magnetic field structure that is complementary to said first correlated magnetic field structure and securely attachable to a toilet seat cover; and
   wherein said first correlated magnetic field structure attachable to said toilet bowl is capable of being aligned with the second correlated magnetic field structure attachable to said toilet seat cover such that said toilet bowl and said toilet seat cover produce an attractive force that secures said toilet seat cover to said toilet seat bowl, said attractive force being a peak spatial force of a spatial force function, said spatial force function corresponding to a code modulo defined by a code, said code modulo defining said peak spatial force and a plurality of off peak spatial forces, said plurality of off peak spatial forces having a largest off peak spatial force, said largest off peak spatial force being less than half of the peak spatial force.

2. The correlated magnet toilet lock of claim 1, further comprising a turning mechanism adapted to be applied to said first or said second correlated magnetic field structure to decorrelate said first or said second correlated magnetic structures enabling said toilet seat cover to be lifted and unlatched from said toilet bowl.

3. The correlated magnet toilet seat cover lock of claim 1, wherein said first and second correlated magnetic field structures are attachable to said toilet bowl and/or toilet seat cover with an adhesive.

4. The correlated magnet toilet seat cover lock of claim 1, wherein at least one of said first or second correlated magnetic field structures are integrated into at least one of said toilet bowl or said toilet seat cover.

5. The correlated magnet toilet seat lock of claim 1, further comprising a third correlated magnetic field structure complementary to said first correlated magnetic field structure and securely attachable to a toilet seat, wherein said first correlated magnetic field structure associated with said toilet bowl is alignable with said second correlated magnetic field structure attached to said toilet seat cover and said third correlated magnetic field structure is alignable with the correlated magnetic structure attachable to toilet bowl to produce an attractive force that secures said toilet seat cover to said toilet seat and further to said toilet seat bowl.

6. The correlated magnet toilet seat lock of claim 5, further comprising a turning mechanism adapted to be applied to said first or said second or said third correlated magnetic field structure to decorrelate said first or said second or said third correlated magnetic structures enabling said toilet seat cover to be lifted and unlatched from said toilet seat and said toilet bowl.

7. A method of locking a seat cover to a toilet bowl using correlated magnets, comprising:
   securing a first correlated magnetic field structure to said toilet bowl;
   securing a second correlated magnetic field structure that is complementary to said first correlated magnetic field structure to said toilet seat cover; and
   aligning said first correlated magnetic field structure associated with said toilet bowl with the second correlated magnetic field structure attached to said toilet seat cover such that said toilet bowl and said toilet seat cover produce an attractive force that secures said toilet seat cover to said toilet seat bowl, said attractive force being a peak spatial force of a spatial force function, said spatial force function corresponding to a code modulo defined by a code, said code modulo defining said peak spatial force and a plurality of off peak spatial forces, said plurality of off peak spatial forces having a largest off peak spatial force, said largest off peak spatial force being less than half of the peak spatial force.

8. The method of claim 7, further comprising applying a turning mechanism to said first or said second correlated magnetic field structure to decorrelate said first or said second correlated magnetic structures enabling said toilet seat cover to be lifted and unlatched from said toilet bowl.

9. The method of claim 7, further comprising attaching said first and second correlated magnetic field structures to said toilet bowl and toilet seat cover with an adhesive.

10. The method of claim 7, further comprising integrating said first and second correlated magnetic field structures into said toilet bowl and said toilet seat cover.

11. The method of claim 7, further comprising securing a third correlated magnetic field structure complementary to said first and said second correlated magnetic field structures to a toilet seat, wherein said first correlated magnetic field structure associated with said toilet bowl is aligned with the second correlated magnetic field structure attached to said toilet seat cover and said third correlated magnetic field structure is aligned with the correlated magnetic structures attached to both said toilet bowl and said toilet seat cover to produce an attractive force that secures said toilet seat cover to said toilet seat and further to said toilet seat bowl.

12. A correlated magnet toilet seat cover lock, comprising:
a first correlated magnetic field structure securely attached to a toilet bowl;
a second correlated magnetic field structure that is complementary to said first correlated magnetic field structure and integrated with an elongated member adapted to protrude over a toilet seat cover associated with said toilet bowl and to secure said toilet seat cover to said toilet bowl via a toilet seat; and
wherein said first correlated magnetic field structure associated with said toilet bowl is aligned with the second correlated magnetic field structure attached to said elongated member such that said toilet bowl and said elongated member toilet seat cover produce an attractive force that secures said toilet seat cover to said toilet seat bowl, said attractive force being a peak spatial force of a spatial force function, said spatial force function corresponding to a code modulo defined by a code, said code modulo defining said peak spatial force and a plurality of off peak spatial forces, said plurality of off peak spatial forces having a largest off peak spatial force, said largest off peak spatial force being less than half of the peak spatial force.

13. The correlated magnet toilet seat cover lock of claim 12, further comprising a turning mechanism adapted to be applied to said first or said second correlated magnetic field structure to decorrelate said first or said second correlated magnetic structures enabling said toilet seat cover to be lifted and unlatched from said toilet bowl.

14. The correlated magnet toilet seat cover lock of claim 13, wherein said elongated member is adapted to rotate such that said second correlated magnetic field structure decorrelates from said first correlated magnetic structure enabling said toilet seat cover to be lifted from said toilet bowl.

15. The correlated magnet toilet seat cover lock of claim 12, wherein said first correlated magnetic field structures is attached to said toilet bowl with an adhesive or is integrated into said toilet bowl.

16. The correlated magnet toilet seat cover lock of claim 12, wherein said elongated member fully detaches from said first correlated magnetic field structure securely attached to said toilet bowl upon rotation and decorrelation of said second correlated magnetic field structure from said first correlated magnetic field structure.

17. A child proof toilet system, comprising:
a toilet bowl with a first correlated magnetic field structure associated therewith;
a toilet seat cover with a second correlated magnetic field structure that is complementary to said first correlated magnetic field structure associated therewith; and
wherein
said first correlated magnetic field structure associated with said toilet bowl is alignable with said second correlated magnetic field structure associated with said toilet seat cover such that said toilet bowl and said toilet seat cover produce an attractive force that secures said toilet seat cover to said toilet seat bowl, and
said attractive force being a peak spatial force of a spatial force function, said spatial force function corresponding to a code modulo defined by a code, said code modulo defining said peak spatial force and a plurality of off peak spatial forces, said plurality of off peak spatial forces having a largest off peak spatial force, said largest off peak spatial force being less than half of the peak spatial force.

18. The system of claim 17, further comprising a turning mechanism adapted to be applied to said first or said second correlated magnetic field structure to decorrelate said first or said second correlated magnetic structures enabling said toilet seat cover to be lifted and unlatched from said toilet bowl.

19. A correlated magnet toilet seat cover lock, comprising:
a flexible strap with a first end attachable to a toilet bowl and a second end including a first correlated magnetic field structure;
a second correlated magnetic field structure that is complementary to said first correlated magnetic field structure and securely attachable to a toilet seat cover; and
wherein:
said first correlated magnetic field structure associated with said flexible strap is capable of being aligned with the second correlated magnetic field structure attachable to said toilet seat cover such that said toilet bowl and said toilet seat cover produce an attractive force that secures said toilet seat cover to said toilet seat bowl, and
said attractive force being a peak spatial force of a spatial force function, said spatial force function corresponding to a code modulo defined by a code, said code modulo defining said peak spatial force and a plurality of off peak spatial forces, said plurality of off peak spatial forces having a largest off peak spatial force, said largest off peak spatial force being less than half of the peak spatial force.

20. The correlated magnet toilet seat cover lock of claim 19, further comprising a turning mechanism adapted to be applied to said first or said second correlated magnetic field structure to decorrelate said first or said second correlated magnetic structures enabling said toilet seat cover to be lifted and unlatched from said toilet bowl.

21. The correlated magnet toilet seat cover lock of claim 19, wherein said first end of said flexible strap includes a third correlated magnetic field structure and said toilet bowl includes a fourth correlated magnetic field structure that is complementary to said third correlated magnetic field structure; and
wherein said third correlated magnetic field structure associated with said first end of said flexible strap is capable of being aligned with said fourth correlated magnetic field structure associated with said toilet bowl such that said toilet bowl and said flexible strap produce an attractive force that secures said flexible strap to said toilet bowl.

* * * * *